United States Patent
Peiffer et al.

(10) Patent No.: US 6,893,706 B2
(45) Date of Patent: May 17, 2005

(54) WHITE, BIAXIALLY-ORIENTED POLYESTER FILM WITH CYCLOOLEFIN COPOLYMER (COC), WHICH IS MATT ON AT LEAST ONE SIDE, METHOD FOR PRODUCTION AND USE THEREOF

(75) Inventors: Herbert Peiffer, Mainz (DE); Holger Kliesch, Mainz (DE); Gottfried Hilkert, Saulheim (DE); Bart Janssens, Wiesbaden (DE)

(73) Assignee: Mitsubishi Polyester Film GmbH, Wiesbaden (DE)

(*) Notice: Subject to any disclaimer, the term of this patent is extended or adjusted under 35 U.S.C. 154(b) by 138 days.

(21) Appl. No.: 10/275,827

(22) PCT Filed: May 3, 2001

(86) PCT No.: PCT/EP01/04969
§ 371 (c)(1),
(2), (4) Date: Nov. 8, 2002

(87) PCT Pub. No.: WO01/85449
PCT Pub. Date: Nov. 15, 2001

(65) Prior Publication Data
US 2003/0180560 A1 Sep. 25, 2003

(51) Int. Cl.$^7$ .................... B32B 27/08; B32B 27/20; B32B 27/36; B32B 31/30
(52) U.S. Cl. .............. 428/141; 428/213; 428/215; 428/480; 428/483; 428/910; 264/288.4; 264/290.2; 525/165; 525/437; 525/444; 528/302; 528/305; 528/308; 528/308.1; 528/308.6
(58) Field of Search ................ 428/141, 480, 428/483, 212, 213, 215, 910; 264/288.4, 290.2; 525/165, 173, 174, 437, 444; 528/302, 305, 308, 308.1, 308.6

(56) References Cited

U.S. PATENT DOCUMENTS

| | | | | |
|---|---|---|---|---|
| 5,955,181 A | * | 9/1999 | Peiffer et al. | 428/212 |
| 6,326,431 B1 | * | 12/2001 | Peiffer et al. | 525/177 |
| 6,627,695 B2 | * | 9/2003 | Murschall et al. | 524/513 |
| 6,635,340 B2 | * | 10/2003 | Murschall et al. | 428/308.4 |
| 6,641,924 B1 | * | 11/2003 | Peiffer et al. | 428/480 |
| 2001/0029274 A1 | * | 10/2001 | Murschall et al. | 524/93 |
| 2002/0033556 A1 | * | 3/2002 | Rounsley | 264/288.8 |
| 2002/0160215 A1 | * | 10/2002 | Peiffer et al. | 428/480 |
| 2003/0170476 A1 | * | 9/2003 | Murschall et al. | 428/483 |
| 2003/0170479 A1 | * | 9/2003 | Peiffer et al. | 428/515 |
| 2003/0224190 A1 | * | 12/2003 | Peiffer et al. | 428/480 |
| 2003/0224191 A1 | * | 12/2003 | Peiffer et al. | 428/480 |
| 2004/0028928 A1 | * | 2/2004 | Bennett et al. | 428/483 |
| 2004/0086732 A1 | * | 5/2004 | Peiffer et al. | 428/480 |

FOREIGN PATENT DOCUMENTS

| | | |
|---|---|---|
| DE | 0 156 464 | 11/1904 |
| DE | 109 224 | 7/1973 |
| DE | 2 353 347 | 5/1974 |
| DE | 237 070 A3 | 7/1986 |
| DE | 195 40 277 A1 | 5/1996 |
| EP | 0 144 878 A2 | 6/1985 |
| EP | 0 283 164 A2 | 9/1988 |
| EP | 0 300 060 A1 | 1/1989 |
| EP | 0 360 201 A2 | 3/1990 |
| EP | 0 407 870 A2 | 1/1991 |
| EP | 0 485 893 A1 | 5/1992 |
| EP | 0 503 422 A1 | 9/1992 |
| EP | 0 602 964 A1 | 6/1994 |
| EP | 0 786 495 A2 | 7/1997 |
| EP | 0 795 399 A1 | 9/1997 |
| EP | 0 976 548 A2 * | 2/2000 |
| EP | 1 068 949 A1 | 1/2001 |
| FR | 2 766 200 A1 | 1/1999 |
| JP | 05-009319 * | 1/1993 |
| JP | 05-140349 * | 6/1993 |
| JP | 05-230253 * | 9/1993 |
| JP | 11-035717 * | 2/1999 |

OTHER PUBLICATIONS

Schimtz, Peter et al., "Films." Ullmann's Encyclopedia Of Industrial Chemistry, 5th Ed., vol. A11, 1988, pp. 85–94.*

* cited by examiner

Primary Examiner—Vivian Chen
(74) Attorney, Agent, or Firm—ProPat, L.L.C.

(57) ABSTRACT

The invention relates to a white, biaxially-oriented and coextruded polyester film which is matt on at least one side with at least one base layer B, which contains a cycloolefin copolymer (COC) in amounts of 4 to 60 wt. %, based on the weight of the base layer, in addition to polyester starting material. The glass transition temperature $T_g$ of the COC lies in the range from 70 to 270° C. Said film has at least one matt outer layer (A), made from polyester and is particularly suitable for use in fast running machines such as winding, metallising, printing or laminating machines.

16 Claims, No Drawings

WHITE, BIAXIALLY-ORIENTED POLYESTER FILM WITH CYCLOOLEFIN COPOLYMER (COC), WHICH IS MATT ON AT LEAST ONE SIDE, METHOD FOR PRODUCTION AND USE THEREOF

The present invention relates to a white, biaxially oriented and coextruded polyester film with at least one matt side and embracing at least one base layer and at least one matt outer layer, where at least the base layer comprises a polyester and a cycloolefin copolymer (COC). The invention further relates to the use of the polyester film and to a process for its production.

BACKGROUND OF THE INVENTION

White, biaxially oriented polyester films are known from the prior art. These known prior-art films are either easy to produce, or have good optical properties, or have acceptable processing performance.

DE-A 2 353 347 describes a process for producing a milky polyester film having one or more layers, which comprises preparing a mixture from particles of a linear polyester with from 3 to 27% by weight of a homopolymer or copolymer of ethylene or propylene, extruding the mixture as a film, quenching the film and biaxially orienting the film via orientation in directions running perpendicular to one another, and heat-setting the film. A disadvantage of this process is that regrind which arises during production of the film (essentially a mixture of polyester and ethylene or propylene copolymer) cannot be reused without yellowing the film. This makes the process uneconomic, but the yellow-tinged film produced with regrind could not gain acceptance in the market.

EP-A 0 300 060 describes a single-layer polyester film which comprises, besides polyethylene terephthalate, from 3 to 40% by weight of a crystalline propylene polymer and from 0.001 to 3% by weight of a surface-active substance. The effect of the surface-active substance is to increase the number of vacuoles in the film and at the same time to reduce their size to the desired extent. This gives the film greater opacity and lower density. A residual disadvantage of the film is that regrind which arises during production of the film (essentially a mixture of polyester and propylene homopolymer) cannot be reused without yellowing the film. This makes the process uneconomic, but the yellow-tinged film produced with regrind could not gain acceptance in the market.

EP-A 0 360 201 describes a polyester film having at least two layers and comprising a base layer with fine vacuoles, with a density of from 0.4 to 1.3 kg/dm$^3$, and having at least one outer layer whose density is above 1.3 kg/dm$^3$. The vacuoles are achieved by adding from 4 to 30% by weight of a crystalline propylene polymer, followed by biaxial stretching of the film. The additional outer layer improves the ease of production of the film (no streaking on the film surface), and the surface tension is increased and the roughness of the laminated surface can be reduced. A residual disadvantage is that regrind arising during production of the film (essentially a mixture of polyester and propylene homopolymer) cannot be reused without yellowing the film. This makes the process uneconomic, but the yellow-tinged film produced with regrind could not gain acceptance in the market.

EP-A 0 795 399 describes a polyester film having at least two layers and comprising a base layer with fine vacuoles, the density of which is from 0.4 to 1.3 kg/dm$^3$, and having at least one outer layer, the density of which is greater than 1.3 kg/dm$^3$. The vacuoles are achieved by adding from 5 to 45% by weight of a thermoplastic polymer to the polyester in the base, followed by biaxial stretching of the film. The thermoplastic polymers used are, inter alia, polypropylene, polyethylene, polymethylpentene, polystyrene or polycarbonate, and the preferred thermoplastic polymer is polypropylene. As a result of adding the outer layer, ease of production of the film is improved (no streaking on the film surface), the surface tension is increased and the roughness of the laminated surface can be matched to prevailing requirements. Further modification of the film in the base layer and/or in the outer layers, using white pigments (generally TiO$_2$) and/or using optical brighteners, permits the properties of the film to be matched to the prevailing requirements of the application. A residual disadvantage is that regrind which arises during production of the film (essentially a mixture of polyester and the added polymer) cannot be reused without undefined and highly undesirable changes in the color of the film. This makes the process uneconomic, but the discolored film produced with regrind could not gain acceptance in the market.

DE-A 195 40 277 describes a polyester film having one or more layers and comprising a base layer with fine vacuoles, with a density of from 0.6 to 1.3 kg/dm$^3$, and having planar birefringence of from −0.02 to 0.04. The vacuoles are achieved by adding from 3 to 40% by weight of a thermoplastic resin to the polyester in the base, followed by biaxial stretching of the film. The thermoplastic resins used are, inter alia, polypropylene, polyethylene, polymethylpentene, cyclic olefin polymers, polyacrylic resins, polystyrene or polycarbonate, preferred polymers being polypropylene and polystyrene. By maintaining the stated limits for the birefringence of the film, the film claimed has in particular superior tear strength and superior isotropy properties. However, a residual disadvantage is that regrind arising during production of the film cannot be reused without undefined discoloration of the film arising, and this in turn is highly undesirable. This makes the process uneconomic, but the colored film produced with regrind could not gain acceptance in the market.

The object of the present invention was to provide a white, biaxially oriented polyester film which has at least one matt side and is easier to produce, i.e. has low production costs. The intention was in particular to ensure that regrind arising directly during the production process can be reused for the production process in amounts of from 10 to 70% by weight, based on the total weight of the film, without any significant resultant adverse effect on the physical or optical properties of the film produced using regrind. In particular, the addition of regrind is intended to cause no significant yellowing of the film.

BRIEF DESCRIPTION OF THE INVENTION

According to the invention, the object is achieved by way of a white, biaxially oriented polyester film with at least one matt side and comprising at least one base layer B and at least one matt outer layer A, both made from polyester, the characteristic features of the film being that at least the base layer B also comprises an amount in the range from 2 to 60% by weight, based on the weight of the base layer B, of cycloolefin copolymer (COC), the glass transition temperature $T_g$ of the cycloolefin copolymer (COC) being in the range from 70 to 270° C.

DETAILED DESCRIPTION OF THE INVENTION

For the purposes of the present invention, a white, biaxially oriented polyester film is a film of this type whose whiteness is above 70%, preferably above 75%, and particularly preferably above 80%. The opacity of the film of the invention is moreover above 55%, preferably above 60%, and particularly preferably above 65%.

To achieve the desired whiteness of the film of the invention, the amount of cycloolefin copolymer (COC) in the base layer B is intended to be greater than 2% by weight, otherwise the whiteness is below 70%. If, on the other hand, the amount of COC is greater than 60% by weight it becomes impossible to produce the film cost-effectively, since reliable stretching of the film becomes impossible.

It is also necessary for the glass transition temperature $T_g$ of the COC used to be above 70° C. Otherwise, if the glass transition temperature $T_g$ of the COC used is below 70° C. the raw material mixture has poor processability because it becomes difficult to extrude. The desired whiteness is lost and the regrind used gives a film with a tendency toward increased yellowing. If, on the other hand, the glass transition temperature $T_g$ of the selected COC is above 270° C. it becomes impossible to achieve adequate homogenization of the raw material mixture in the extruder. This then results in a film with undesirably inhomogeneous properties.

In the preferred embodiment of the film of the invention, the glass transition temperature $T_g$ of the COCs used is in a range from 90 to 250° C., and in the particularly preferred embodiment it is in a range from 110 to 220° C.

Surprisingly, it has been found that the addition of a COC in the manner described above can produce a white, opaque film.

The whiteness and the opacity of the film can be adjusted precisely and adapted to the prevailing requirements as a function of the amount and the nature of the COC added. By using this measure it is possible to dispense substantially with any use of other familiar whitening and opacifying additives.

None of these features described was foreseeable. All the more so, since although COCs appear to be substantially incompatible with polyethylene terephthalate they are known to be oriented using stretching conditions and stretching temperatures which are similar to those for polyethylene terephthalate. In these circumstances the skilled worker would not have expected to be able to produce a white, opaque film under these production conditions.

In the preferred and the particularly preferred embodiments, the film of the invention has high and, respectively, particularly high whiteness and high and, respectively, particularly high opacity, while the change of film color resulting from regrind addition remains extremely small.

The film of the invention is a multilayer film. Multilayer embodiments have at least two layers and always embrace the COC-containing base layer B and at least one matt outer layer A. In one preferred embodiment, the COC-containing layer forms the base layer B of the film with at least one outer layer or with outer layers on both sides, and, where appropriate, there may be (an) intermediate layer(s) present on one or both sides. In another preferred embodiment, the COC-containing layer also forms an intermediate layer of the multilayer film. Other embodiments with COC-containing intermediate layers have a five-layer structure with, alongside the COC-containing base layer B, COC-containing intermediate layers on both sides. In another embodiment, in addition to the base layer, the COC-containing layer may form (an) outer layer(s) on one side or both sides, on the base layer or intermediate layer. For the purposes of the present invention, the base layer is the layer which makes up more than from 30 to 99.5%, preferably from 70 to 95%, of the entire thickness of the film. The outer layer is the layer which forms the outermost layer of the film.

Each embodiment of the invention is a non-transparent, opaque film. For the purposes of the present invention, non-transparent films are films whose light transmittance to ASTM D1003-77 is below 95%, preferably below 75%.

The COC-containing layer (the base layer B) of the film of the invention comprises a polyester, preferably a homopolyester, a COC, and, where appropriate, other additives, each in effective amounts. This layer generally comprises at least 20% by weight, preferably from 40 to 96% by weight, in particular from 70 to 96% by weight, of polyester, based on the weight of the layer.

The base layer B of the film comprises a thermoplastic polyester. Polyesters suitable for this purpose are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT), or else from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters composed of at least 90 mol %, preferably at least 95 mol %, of ethylene glycol units and terephthalic acid units or ethylene glycol units and naphthalene-2,6-dicarboxylic acid units. The remaining monomer units are derived from other aliphatic, cycloaliphatic, or aromatic diols and, respectively, dicarboxylic acids.

Examples of other suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol, and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols are those of the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—X—$C_6H_4$—OH are also highly suitable.

Other preferred aromatic dicarboxylic acids are benzenedicarboxylic acids, naphthalenedicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid), and stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the ($C_3$-$Cl_9$)-alkanedioic acids are particularly suitable, where the alkane moiety may be straight-chain or branched.

An example of a method for preparing the polyester is the transesterification process. The starting materials here are dicarboxylic esters and diols, and these are reacted using the usual transesterification catalysts, such as salts of zinc, of calcium, of lithium, of magnesium or of manganese. The intermediates are then polycondensed in the presence of typical polycondensation catalysts, such as antimony trioxide or titanium salts. They may equally well be prepared by the direct esterification process in the presence of polycondensation catalysts, starting directly from the dicarboxylic acids and the diols.

According to the invention, the COC-containing layer comprises an amount of not less than 2.0% by weight, preferably from 4 to 50% by weight and particularly preferably from 6 to 40% by weight, of a cycloolefin copolymer (COC), based on the weight of the layer or, in the case of single-layer embodiments, based on the weight of the film. It is significant for the present invention that the COC is not compatible with the polyethylene terephthalate and does not form a homogeneous mixture with the same in the melt.

Cycloolefin polymers are homopolymers or copolymers which contain polymerized cycloolefin units and, if desired, acyclic olefins as comonomer. Cycloolefin polymers suitable for the present invention contain from 0.1 to 100% by weight, preferably from 10 to 99% by weight, particularly preferably from 50 to 95% by weight, of polymerized cycloolefin units, in each case based on the total weight of the cycloolefin polymer. Particular preference is given to polymers which have been built up using the monomers comprising the cyclic olefins of the formulae I, II, III, IV, V or VI:

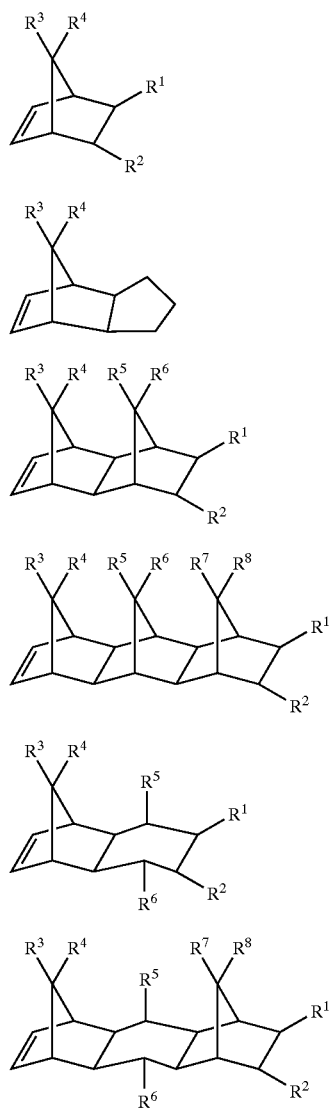

$R^1$, $R^2$, $R^3$, $R^4$, $R^5$, $R^6$, $R^7$ and $R^8$ in these formulae are identical or different and are a hydrogen atom or a $C_1$–$C_{30}$-hydrocarbon radical, or two or more of the radicals $R^1$ to $R^8$ have been bonded cyclically, and the same radicals in the different formulae may have the same or a different meaning. Examples of $C_1$–$C_{30}$-hydrocarbon radicals are linear or branched $C_1$–$C_8$-alkyl radicals, $C_6$–$C_{18}$-aryl radicals, $C_7$–$C_{20}$-alkylenearyl radicals and cyclic $C_3$–$C_{20}$-alkyl radicals and acyclic $C_2$–$C_{20}$-alkenyl radicals.

If desired, the COCs may contain from 0 to 45% by weight, based on the total weight of the cycloolefin polymer, of polymerized units of at least one monocyclic olefin of the formula VII:

n here is a number from 2 to 10.

If desired, the COCs may contain from 0 to 99% by weight, based on the total weight of the COC, of polymerized units of an acyclic olefin of the formula VIII:

$R^9$, $R^{10}$, $R^{11}$ and $R^{12}$ here are identical or different and are a hydrogen atom or a $C_1$–$C_{10}$-hydrocarbon radical, e.g. a $C_1$–$C_8$-alkyl radical or a $C_6$–$C_{14}$-aryl radical.

Other polymers suitable in principle are cycloolefin polymers which are obtained by ring-opening polymerization of at least one of the monomers of the formulae I to VI, followed by hydrogenation.

Cycloolefin homopolymers have a structure composed of one monomer of the formulae I to VI. These cycloolefin polymers are less suitable for the purposes of the present invention. Polymers suitable for the purposes of the present invention are cycloolefin copolymers (COC) which comprise at least one cycloolefin of the formulae I to VI and acyclic olefins of the formula VIII as comonomer. Acyclic olefins preferred here are those which have from 2 to 20 carbon atoms, in particular unbranched acyclic olefins having from 2 to 10 carbon atoms, for example ethylene, propylene and/or butylene. The proportion of polymerized units of acyclic olefins of the formula VIII is up to 99% by weight, preferably from 5 to 80% by weight, particularly preferably from 10 to 60% by weight, based on the total weight of the respective COC.

Among the COCs described above, those which are particularly preferred contain polymerized units of polycyclic olefins having a fundamental norbornene structure, particularly preferably norbornene or tetracyclododecene. Particular preference is also given to COCs which contain polymerized units of acyclic olefins, in particular ethylene. Particular preference is in turn given to norbornene-ethylene copolymers and tetracyclododecene-ethylene copolymers which in each case contain from 5 to 80% by weight, preferably from 10 to 60% by weight, of ethylene (based on the weight of the copolymer).

The cycloolefin polymers generically described above generally have glass transition temperatures $T_g$ in the range from −20 to 400° C. However, COCs which can be used for the invention have a glass transition temperature $T_g$ above 70° C., preferably above 90° C. and in particular above 110° C. The viscosity number (decalin, 135° C., DIN 53 728) is advantageously from 0.1 to 200 ml/g, preferably from 50 to 150 ml/g.

The COCs are prepared by heterogeneous or homogeneous catalysis with organometallic compounds, as described in a wide variety of documents. Suitable catalyst systems based on mixed catalysts made from titanium compounds and, respectively, vanadium compounds in conjunction with aluminum organyl compounds are described in DD 109 224, DD 237 070 and EP-A-0 156 464. EP-A-0 283 164, EP-A-0 407 870, EP-A-0 485 893 and EP-A-0 503 422 describe the preparation of COCs with catalysts based on soluble metallocene complexes. The preparation processes for COCs described in the abovementioned specifications are expressly incorporated herein by way of reference.

The COCs are incorporated into the film either in the form of pure granules or in the form of granulated concentrate (masterbatch), by premixing the polyester granules or polyester powder with the COC or, respectively, with the COC masterbatch, followed by feeding to an extruder. In the extruder, the mixing of the components continues and they are heated to the processing temperature. It is advantageous here for the novel process if the extrusion temperature is above the glass transition temperature $T_g$ of the COC, generally above the glass transition temperature $T_g$ of the COC by at least 5 K, preferably by from 10 to 180 K, in particular by from 15 to 150 K.

The advantageous embodiment of the matt outer layer A comprises additives in the form of inert inorganic antiblocking agents and, where appropriate, a blend or a mixture of two components (I) and (II).

Typical antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc or manganese salts of the dicarboxylic acids used, carbon black, titanium dioxide, kaolin or crosslinked polymer particles, e.g. polystyrene particles or acrylate particles.

The additives selected may also comprise mixtures of two or more different antiblocking agents or mixtures of antiblocking agents of the same composition but different particle sizes. The particles may be added to the polymers of the individual layers of the film in the respective advantageous amounts, e.g. as a glycolic dispersion during the polycondensation or via masterbatches during extrusion. Pigment concentrations which have proven particularly suitable are from 0 to 25% by weight (based on the weight of the respective layer). EP-A-0 602 964, for example, describes the antiblocking agents in detail.

Component (I) of the mixture or of the blend is an ethylene terephthalate homopolymer or ethylene terephthalate copolymer, or a mixture made from ethylene terephthalate homo- or copolymers.

Component (II) of the mixture or of the blend is an ethylene terephthalate copolymer which is composed of the condensation product of the following monomers or of their derivatives capable of forming polyesters:

A) from 65 to 95 mol % of isophthalic acid;
B) from 0 to 30 mol % of at least one aliphatic dicarboxylic acid having the formula $HOOC(CH_2)nCOOH$, where n is in the range from 1 to 11;
C) from 5 to 15 mol % of at least one sulfomonomer containing an alkali metal sulfonate group on the aromatic moiety of a dicarboxylic acid;
D) a copolymerizable aliphatic or cycloaliphatic glycol having from 2 to 11 carbon atoms, in the stoichiometric amount necessary to form 100 mol % of condensate;

each of the percentages given being based on the total amount of the monomers forming component (II). For a detailed description of component (II) reference is made to the content of EP-A 0 144 878, which is expressly incorporated herein by way of reference.

For the purposes of the present invention, mixtures are mechanical mixtures prepared from the individual components. For this, the individual constituents are generally combined in the form of small-dimensioned compressed moldings, e.g. lenticular or bead-shaped pellets, and mixed with one another mechanically, using a suitable agitator. Another way of producing the mixture is to feed components (I) and (II) in pellet form separately to the extruder for the outer layer of the invention, and to carry out mixing in the extruder and/or in the downstream systems for transporting the melt.

For the purposes of the present invention, a blend is an alloy-like composite of the individual components (I) and (II) which can no longer be separated into the initial constituents. A blend has properties like those of a homogeneous material and can therefore be characterized by appropriate parameters.

The ratio (ratio by weight) of the two components (I) and (II) of the outer layer mixture or of the blend can be varied within wide limits and depends on the intended use of the multilayer film. The ratio of components (I) and (II) is preferably in the range from (I):(II)=10:90 to (I):(II) 95:5, preferably from (I):(II)=20:80 to (I):(II) 95:5, and in particular from (I):(II)=30:70 to (I):(II)=95:5.

In one preferred embodiment, the matt outer layer A is characterized by the following set of parameters:

The roughness of the matt outer layer A, expressed in terms of $R_a$, is in the range from 200 to 1000 nm, preferably from 220 to 950 nm and particularly preferably from 250 to 900 nm. Values smaller than 200 nm have adverse effects on the mattness of the surface, while values greater than 1000 nm impair the optical properties of the film.

The value measured for gas flow should be in the range from 0 to 50 s, preferably from 1 to 45 s. At values above 50 s the mattness of the film is adversely affected.

The base layer B and the other layers may also comprise conventional additives, such as stabilizers, antiblocking agents, and other fillers. The additives are usefully added to the polymer or to the polymer mixture before melting begins. Examples of stabilizers used are phosphorus compounds, such as phosphoric acid or phosphoric esters.

To improve the whiteness of the film, the base layer or the other additional layers may comprise further pigmentation. It has proven particularly advantageous here for the additional additives used to comprise barium sulfate with grain size of from 0.3 to 0.8 μm, preferably from 0.4 to 0.7 μm, or titanium dioxide with grain size of from 0.05 to 0.3 μm, in each case measured by the sedigraph method. This gives the film a brilliant white appearance. The amount of barium sulfate or titanium dioxide is in the range from 1 to 25% by weight, preferably from 1 to 20% by weight, and very preferably from 1 to 15% by weight.

The total thickness of the film can vary within wide limits and depends on the intended application. The preferred embodiments of the film of the invention have total thicknesses from 4 to 400 μm, preferably from 8 to 300 μm, in particular from 10 to 300 μm. The thickness(es) of any intermediate layer(s) present is/are generally from 0.5 to 15 μm, independently of each other, and preference is given to intermediate layer thicknesses of from 1 to 10 μm, in particular from 1 to 8 μm. The values given are each based on one intermediate layer. The thickness(es) of the outer layer(s) is/are selected independently of the other layers and is/are preferably in the range from 0.1 to 10 μm, in particular from 0.2 to 5 μm, with preference from 0.3 to 4 μm, and outer layers applied to both sides may have identical or different thickness and composition. The thickness of the base layer B is correspondingly given by the difference between the total thickness of the film and the thickness of the outer layer(s) and intermediate layer(s) applied, and can therefore vary similarly to the total thickness within wide limits.

The invention also provides a process for producing the polyester film of the invention by extrusion or coextrusion methods known per se.

The procedure for this process is that the melts corresponding to individual layers of the film are coextruded through a flat-film die, the resultant film is drawn off on one or more rollers for solidification, the film is then biaxially stretched (oriented), and the biaxially stretched film is heat-set and, where appropriate, corona- or flame-treated on the surface intended for treatment.

The biaxial stretching is usually carried out sequentially. For this, it is preferable to begin by stretching longitudinally (i.e. in the machine direction=MD) and then to stretch transversely (i.e. perpendicularly to the machine direction= TD). This orients the molecular chains. The longitudinal stretching preferably takes place with the aid of two rollers rotating at different peripheral speeds corresponding to the desired stretching ratio. For the transverse stretching, use is generally made of an appropriate tenter frame.

The temperature at which the stretching is carried out may vary within a relatively wide range, and depends on the desired properties of the film. The longitudinal stretching is generally carried out at from 80 to 130° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1.

The stretching may also takes place in a simultaneous stretching frame (simultaneous stretching), and the number of stretching steps and the sequence (longitudinal/ transverse) is not of decisive importance here for the property profile of the film. However, advantageous stretching temperatures here are $\leq 125°$ C., particularly $\leq 115°$ C. The stretching ratios correspond to those in the conventional sequential process.

In the heat-setting which follows, the film is held at a temperature of from 150 to 250° C. for from about 0.1 to 10 s. The film is then cooled and is wound up in the usual manner. However, before winding-up, the film may also be chemically treated, or else corona- or flame-treated to establish other desired properties. The intensity of treatment is adjusted so that the surface tension of the film is generally above 45 mN/m.

The film may also be coated to achieve other properties. Typical coatings are those with adhesive action, antistatic action, slip-improving action, or release action. These additional layers may, of course, be applied to the film by in-line coating, using aqueous dispersions, after longitudinal stretching and prior to transverse stretching.

The particular advantage of the film of the invention is its high whiteness and its high opacity. The whiteness of the film is above 70%, preferably above 75%, and particularly preferably above 80%. The opacity of the film of the invention is above 55%, preferably above 60%, and particularly preferably above 65%. The gloss of the outer layer A is below 80, preferably below 70 and particularly preferably below 60.

Another particularly surprising advantage of the invention is that during production of the film it is possible for directly associated regrind to be reused for the production process in amounts of from 10 to 70% by weight, based on the total weight of the film, without any resultant significant adverse effect on the physical properties of the film produced using the regrind. In particular, the regrind (substantially composed of polyester and COC) does not cause undefined change in the film color, whereas this is always the case with prior-art films.

A further advantage of the invention is that the production costs of the film of the invention are comparable with those for conventional prior-art opaque films. The other properties of the film of the invention relevant to its processing and use remain substantially unchanged, or indeed have been improved.

The film has excellent suitability for packaging for foods or other consumable items which are sensitive to light and/or to air. It also has excellent suitability for industrial use, e.g. in the production of hot-stamping foils, or as a label film. The film is naturally also particularly suitable for image-recording papers, printed sheets, or magnetic recording cards, to mention just a few possible applications.

The film has outstandingly good processing and winding performance in particular on high-speed machinery (winders, metallizers, printing machines or laminating machines). One measure of processing performance is the coefficient of friction of the film, and this is below 0.6. A good thickness profile, excellent layflat, and low coefficient of friction affect winding performance, and the roughness of the film has a decisive effect on winding performance. It has been found that the winding of the film of the invention is particularly good when the average roughness is in a range from 50 to 1000 nm while the other properties are retained. Methods of varying the roughness include varying the COC concentration, the mattness of outer layer A, and the process parameters during the production process, within the range given.

The table below (Table 1) gives a further particularly illustrative summary of the most important film properties of the invention:

TABLE 1

| | Inventive range | preferred | particularly preferred | Unit | Test method |
|---|---|---|---|---|---|
| Formulation | | | | | |
| Concentration of cycloolefin copolymer (COC) in base layer | 2–60 | 4–50 | 6–40 | % | |
| Glass transition temperature of cycloolefin copolymer (COC) | 70–270 | 90–250 | 110–220 | ° C. | DIN 73 765 |

TABLE 1-continued

| | Inventive range | preferred | particularly preferred | Unit | Test method |
|---|---|---|---|---|---|
| Outer layer A | | | | | |
| COF | <0.5 | <0.45 | <0.40 | | DIN 53 375 |
| Average roughness $R_a$ | 200–1000 | 220–950 | 250–900 | nm | DIN 4768, cut-off of 0.25 mm |
| Gloss, 60° | <80 | <70 | <60 | | DIN 67 530 |
| Other film properties | | | | | |
| Whiteness | >70 | >75 | >80 | % | Berger |
| Opacity | >55 | >60 | >65 | | DIN 53 146 |

The following measured values were utilized to characterize the raw materials and the films:

SV (Standard Viscosity)

Standard viscosity SV (DCA) is measured by a method based on DIN 53726 in dichloroacetic acid.

Intrinsic viscosity (IV) is calculated as follows from standard viscosity $$IV(DCA)=6.67 \cdot 10^{-4} \, SV(DCA)+0.118$$

Coefficient of Friction (COF)

Coefficient of friction was determined to DIN 53 375. The coefficient of sliding friction was measured 14 days after production.

Surface Tension

Surface tension was determined by what is known as the ink method (DIN 53 364).

Roughness

Roughness $R_a$ of the film was determined to DIN 4768 with a cut-off of 0.25 mm.

Whiteness and Opacity

Whiteness and opacity were determined with the aid of the "ELREPHO" electrical reflectance photometer from the company Zeiss, Oberkochem (DE), standard illuminant C, 2° standard observer. Opacity is determined to DIN 53 146. Whiteness is defined as W=RY+3RZ−3RX.

W=whiteness, and RY, RZ and RX=relevant reflection factors when the Y, Z or X color-measurement filter is used. The white standard used was a barium sulfate pressing (DIN 5033, Part 9). An example of a detailed description is given in Hansl Loos "Farbmessung" [Color Measurement], Verlag Beruf und Schule, Itzehoe (1989).

Light Transmittance

Light transmittance is measured using a method based on ASTM D1033-77.

Gloss

Gloss was determined to DIN 67 530. The reflectance was measured as an optical value characteristic of a film surface. Based on the standards ASTM-D 523-78 and ISO 2813, the angle of incidence was set at 600. A beam of light hits the flat test surface at the set angle of incidence and is reflected and/or scattered by this surface. A proportional electrical variable is displayed representing light beams hitting the photoelectronic detector. The value measured is dimensionless and must be stated together with the angle of incidence.

Glass Transition Temperature

Glass transition temperature $T_g$ was determined using film specimens with the aid of DSC (differential scanning calorimetry) (DIN 73 765) A DuPont DSC 1090 was used. The heating rate was 20 K/min and the specimen weight was about 12 mg. The glass transition $T_g$ was determined in the first heating procedure. Many of the specimens showed an enthalpy relaxation (a peak) at the beginning of the step-like glass transition. The temperature taken as $T_g$ was that at which the step-like change in heat capacity—without reference to the peak-shaped enthalpy relaxation—achieved half of its height in the first heating procedure. In all cases, there was only a single glass transition observed in the thermogram in the first heating procedure.

EXAMPLE 1 (INVENTIVE)

Chips of polyethylene terephthalate (prepared by the transesterification process using Mn as trans-esterification catalyst, Mn concentration: 100 ppm) were dried at 150° C. to a residual moisture below 100 ppm and fed to the extruder for the base layer B. Alongside this, chips of ® Topas 6015 cycloolefin copolymer (COC) from Ticona (COC composed of 2-norbornene and ethylene, see also W. Hatke: Folien aus COC [COC Films], Kunststoffe 87 (1997) 1, pp. 58–62) with a glass transition temperature $T_g$ of about 160° C. were also fed to the extruder for the base layer B. The proportional amount of the cycloolefin copolymer (COC) in the base layer was 10% by weight.

Coextrusion followed by stepwise longitudinal and transverse orientation was used to produce a white, opaque, three-layer film with ABC structure, with a total thickness of 23 µm, and with one matt side. The thickness of each of the outer layers is given in Table 2.

| Matt outer layer A, a mixture of: | |
|---|---|
| 55.0% | by weight of polyethylene terephthalate with SV 800 = component (I) |
| 15.0% | by weight of component (II)* |
| 30.0% | by weight of masterbatch made from 95% by weight of polyethylene terephthalate (SV 800) and 5.0% by weight of ®Sylobloc 44 H (synthetic SiO$_2$ from Grace) |
| Base layer B, a mixture of: | |
| 90.0% | by weight of polyethylene terephthalate homopolymer with SV 800 |
| 10.0% | by weight of cycloolefin copolymer (COC) from Ticona, Topas 6015 |
| Outer layer C, a mixture of: | |
| 97.0% | by weight of polyethylene terephthalate homopolymer with SV 800 |
| 3.0% | by weight of masterbatch made from 97.75% by weight of polyester (SV 800), 1.0% by weight of ®Sylobloc 44 H (synthetic SiO$_2$ from Grace), and 1.25% by weight of ®Aerosil TT 600 (fumed SiO$_2$ from Degussa). |

*Component (II) was prepared as described in more detail in Example 1 of EP-A 0 144 878.

The production conditions for each of the steps of the process were:

| Extrusion: | Temperatures base layer: | 280° C. |
| --- | --- | --- |
| | Temperature of take-off roll: | 30° C. |
| Longitudinal stretching: | Temperature: | 80 to 125° C. |
| | Longitudinal stretching ratio: | 4.2 |
| Transverse stretching: | Temperature: | 80 to 135° C. |
| | Transverse stretching ratio: | 4.0 |
| Setting: | Temperature: | 230° C. |
| | Duration: | 3 s |

The film had the required good properties and the desired handling, and the desired processing performance. The properties achieved in films produced in this way are shown in Table 2.

EXAMPLE 2 (INVENTIVE)

Taking Example 1 as a basis, 50% by weight of regrind was now added to the base layer. The amount of COC in the resultant base layer was again 10% by weight. The process parameters were unchanged from Example 1. Visual observation was made of the extent of yellow discoloration of the film. It is seen from Table 2 that hardly any yellow discoloration of the film was visible.

EXAMPLE 3 (INVENTIVE)

Taking Example 1 as a basis, a film of thickness 96 μm was now produced. The amount of COC in the base layer was 8% by weight. The process parameters were unchanged from Example 1. Visual observation was made of the extent of yellow discoloration of the film. It is seen from Table 2 that hardly any yellow discoloration of the film was visible.

| Base layer B, a mixture of: | |
| --- | --- |
| 92.0% | by weight of polyethylene terephthalate homopolymer with SV 800 |
| 8.0% | by weight of cycloolefin copolymer (COC) from Ticona, Topas 6015 |

EXAMPLE 4 (INVENTIVE)

Taking Example 3 as a basis, 50% by weight of regrind was now added to the base layer B. The amount of COC in the base layer was again 8% by weight. The process parameters were unchanged from Example 1. Visual observation was made of the extent of yellow discoloration of the film. It is seen from Table 2 that hardly any yellow discoloration of the film was visible.

COMPARATIVE EXAMPLE 1

Example 1 of DE-A 23 53 347 was repeated. The example was modified by additionally including 50% by weight of regrind in the process. It is seen from Table 2 that there was marked visible yellow discoloration of the film.

| Base layer B, a mixture of: | |
| --- | --- |
| 47.5% | by weight of polyethylene terephthalate homopolymer with SV 800 |
| 50.0% | by weight of regrind of the same material (95% by weight of polyester + 5% by weight of polypropylene) |
| 2.5% | by weight of polypropylene |

COMPARATIVE EXAMPLE 2

Example 1 of EP-A 0 300 060 was repeated. The example was modified by additionally including 50% by weight of regrind in the process. It is seen from Table 2 that there was marked visible yellow discoloration of the film.

| Base layer B, a mixture of: | |
| --- | --- |
| 45.0% | by weight of polyethylene terephthalate homopolymer with SV 800 |
| 50.0% | by weight of regrind of the same material (90% by weight of polyester + 10% by weight of polypropylene) |
| 5.0% | by weight of polypropylene |

COMPARATIVE EXAMPLE 3

Example 1 of EP-A 0 360 201 was repeated. The example was modified by additionally including 50% by weight of regrind in the process. It is seen from Table 2 that there was marked visible yellow discoloration of the film.

| Base layer B, a mixture of: | |
| --- | --- |
| 40.0% | by weight of polyethylene terephthalate homopolymer with SV 800 |
| 50.0% | by weight of regrind of the same material (80% by weight of polyester + 20% by weight of polypropylene) |
| 10.0% | by weight of polypropylene |

COMPARATIVE EXAMPLE 4

Example 1 of DE-A 195 40 277 was repeated. The example was modified by additionally including 50% by weight of regrind in the process. It is seen from Table 2 that there was marked visible yellow discoloration of the film.

| Base layer B, a mixture of: | |
| --- | --- |
| 43.5% | by weight of polyethylene terephthalate homopolymer with SV 800 |
| 50.0% | by weight of regrind of the same material (87% by weight of polyester + 13% by weight of polystyrene) |
| 6.5% | by weight of polystyrene |

TABLE 2

| Example | Film thickness μm | Layer structure and layer thicknesses | Polymer added to polyester | Additive concentration in base layer % by wt. | Glass transition temperature of additive ° C. | Whiteness % | Opacity % | Assessment of film yellowness | Gloss Outer layer A | Coefficient of friction COF Side A with respect to side C | Average roughness $R_a$ Side A nm | Side C nm |
| --- | --- | --- | --- | --- | --- | --- | --- | --- | --- | --- | --- | --- |
| E1 | 23 | ABC (2/19/2) | COC | 10 | 170 | 75 | 75 | ++ | 45 | 0.3 | 350 | 120 |

TABLE 2-continued

| Example | Film thickness μm | Layer structure and layer thicknesses | Polymer added to polyester | Additive concentration in base layer % by wt. | Glass transition temperature of additive °C. | Whiteness % | Opacity % | Assessment of film yellowness | Gloss Outer layer A | Coefficient of friction COF Side A with respect to side C | Average roughness $R_a$ Side A nm | Average roughness $R_a$ Side C nm |
|---|---|---|---|---|---|---|---|---|---|---|---|---|
| E2 | 23 | ABC (2/19/2) | COC | 10 | 170 | 76 | 80 | + | 45 | 0.3 | 350 | 110 |
| E3 | 96 | ABC (2/92/2) | COC | 8 | 170 | 85 | 85 | ++ | 40 | 0.3 | 330 | 100 |
| E4 | 96 | ABC (2/92/2) | COC | 8 | 170 | 86 | 90 | + | 40 | 0.3 | 320 | 98 |
| CE1 | 155 | B | Polypropylene | 5 | −10 | 80 | 70 | − | 46 | 0.45 | 410 | 410 |
| CE2 | 100 | B | Polypropylene | 10 | −10 | 88 | 80 | − | 57 | 0.45 | 180 | 180 |
| CE3 | 100 | ABA | Polypropylene | 20 | −10 | 92 | 89 | − | 54 | 0.25 | 370 | 370 |
| CE4 | 125 | B | Polystyrene | 13 | 100 | 82 | 82 | − | 51 | 0.35 | 480 | 480 |

Key to yellowness of films produced:
++: no yellow coloration discernible
+: slight yellow coloration discernible
−: marked yellow coloration discernible

What is claimed is:

1. A white, biaxially oriented and coextruded polyester film with at least one matt side and embracing at least one base layer B and at least one matt outer layer A, both made from polyester, wherein at least the base layer comprises, based on the weight of this layer, from 2 to 60% by weight of cycloolefin copolymer (COC), where the glass transition temperature $T_g$ of the COC is in the range from 70 to 270° C.,
   wherein the matt outer layer A exhibits a roughness, expressed as $R_g$, in the range from about 200 to 1000 nm and the value measured for gas flow in the range from about 0 to about 50 g.

2. The white polyester film, as claimed in claim 1, wherein the COC comprises polynorbornene, polydimethylocahydronaphthalene, polycyclopentene or poly-5-methylnorbornene.

3. The white polyester film, as claimed in claim 1, wherein the COC has a glass transition temperature $T_g$ in the range from about 90 to about 250° C.

4. The white polyester film as claimed in claim in 1, wherein a matt outer layer A has been arranged on the COC-containing base layer B, and comprises additive in the form of inert inorganic antiblocking agents and, comprises a blend or a mixture made from two components (I) and (II), and wherein component (I) of the mixture or of the blend is an ethylene terephthalate homopolymer or ethylene terephthalate copolymer or a mixture made from these, and wherein component (II) of the mixture or of the blend is an ethylene terephthalate copolymer which is composed of the condensation product of the following monomers or of their derivatives capable of forming polyesters:
   A) from about 65 to about 95 mol % of isophthalic acid;
   B) from about 0 to about 30 mol % of at least one aliphatic dicarboxylic acid having the formula $HOOC(CH_2)_nCOOH$, where n is in the range from 1 to 11;
   C) from about 5 to about 15 mol % of at least one sulfomonomer containing an alkali metal sulfonate group on the aromatic moiety of a dicarboxylic acid;
   D) a copolymerizable aliphatic or cycloaliphatic glycol having from 2 to 11 carbon atoms, in the stoichiometric amount necessary to form 100 mol % of condensate; where each of the percentage is based on the total amount of monomers forming component (II), and wherein the weight ratio of the two components (I) and (II) of the mixture for the outer layer A, or of the blend, is in the range from about (I):(II)=10:90 to about (I):(II) 95:5.

5. The white polyester film, as claimed in claim 1, wherein the total thickness of the film is in the range from about 4 to about 400 μm, and wherein the thickness of the outer layer(s) is in the range from about 0.1 to about 10 μm, where outer layers applied on the two sides may be identical or different in their thickness and makeup.

6. The white polyester film, as claimed in claim 1, wherein the whiteness of the film is above about 70%.

7. The white polyester film, as claimed in claims 1, wherein the opacity of the film is above about 55%.

8. The white polyester film, as claimed in claim 1, wherein the gloss of the film on the surface of the outer layer A is below about 80.

9. The white polyester film, as claimed in claim 8, wherein an intermediate layer has been arranged between the COC-containing base layer B and the matt outer layer A and has a thickness in the range from about 0.5 to about 15 μm.

10. The white polyester film, as claimed in claim 1, wherein the base layer B also comprises, in mach case based on the total weight of the base layer B, from about 0.5 to about 25% by weight of one or more compounds selected from vacuole-inducing compounds other than COC, white fillers and pigments.

11. A process for producing a white polyester film with at least one matt side, as claimed in claim 1, in which the melts corresponding to the individual layers of the film are coextruded through a flat-film die, the resultant film is drawn off on one or more rollers for solidification, the film is then biaxially stretched (oriented), and the biaxially stretched film is heat-set and is then wound up, which process comprises carrying out the biaxial stretching in a sequence, first stretching longitudinally and then transversely, and which comprises carrying out the longitudinal stretching at a temperature in the range from about 80 to about 13° C. and the trasverse stretching at a temperature in the range from about 90 to about 150° C., and which comprises setting the longitudinal stretching ratio in the range from about 2.5:1 to about 6:1, and the transverse stretching ratio in the range from about 3.0:1 to about 5.0:1.

12. A process for producing a white polyester film, as claimed claim 1, in which the melts corresponding to the individual layers of the film are coextruded ugh a flat-film die, the resultant film is drawn off on one or more rollers for solidification, the film is then biaxially stretched (oriented), and the biaxially stretched film is heat-set and is th wound up, which process comprises carrying out the stretching in a simultaneous stretching frame, and which comprises setting the stretching temperature to about $\leqq 125°$ C.

13. The process as claimed in claim 11 or 12, wherein the film is held for a period of from about 0.1 to about 10 s at a temperature in the range from about 150 to about 250° C. after stretching for heat-setting, and wherein the film is then cooled and wound up.

14. The process sa claimed in claim 11 or 12, wherein, after heat-setting and prior to winding-up, the film is chemically treated or corona-, or flame-treated where the intensity of treatment is adjusted so that the surface tension of the film after treatment is greater than or equal to about 45 mN/m.

15. The process as claimed in claim 11 or 12, wherein cut material directly associated with the production of the film is introduced back into the production process as regrind in amounts in the range from about 10 to about 70% by weight based on the total weight of the film.

16. A method of making a packaging for foods or other consumable items which are sensitive to light or to air or light and air, a hot-stamping foil, a label film, an image-recording paper, a printed sheet or a magnetic recording card, which method comprises converting a film according to claim 1 into a packaging for foods or other consumable items which are sensitive to light or to air or light and air a hot-stamping foil, a label film, an image-recording paper, a printed sheet or a magnetic recording card.

* * * * *